United States Patent
Van de Wege et al.

(10) Patent No.: US 10,426,086 B2
(45) Date of Patent: Oct. 1, 2019

(54) CHAFF SPREADER WITH SEED BRUISING

(71) Applicant: CNH Industrial America LLC, New Holland, PA (US)

(72) Inventors: Charlotte Van de Wege, Zulte (BE); Frederik Baes, Reninge (BE); Yvan C. C. Vandergucht, Lo-Reninge (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/440,467

(22) Filed: Feb. 23, 2017

(65) Prior Publication Data

US 2017/0238463 A1    Aug. 24, 2017

(30) Foreign Application Priority Data

Feb. 23, 2016  (BE) .................................. 2016/5126

(51) Int. Cl.
*A01D 41/12* (2006.01)
*A01F 12/40* (2006.01)

(52) U.S. Cl.
CPC .......... *A01D 41/1243* (2013.01); *A01F 12/40* (2013.01)

(58) Field of Classification Search
CPC ...... A01D 41/123; A01D 90/06; A01D 43/08; A01D 43/077; A01D 57/10; A01D 87/0007; A01F 12/40; A01F 29/01; A01F 29/02; A01F 29/06; A01F 29/12
See application file for complete search history.

(56) References Cited

U.S. PATENT DOCUMENTS

| | | | | |
|---|---|---|---|---|
| 4,062,366 | A * | 12/1977 | De Coene | A01D 41/12 460/14 |
| 4,292,795 | A * | 10/1981 | Linn | A01F 12/40 460/111 |
| 4,684,068 | A |  8/1987 | Busboom | |
| 4,836,456 | A |  6/1989 | Van Der Lely | |
| 5,082,186 | A |  1/1992 | Bruns | |
| 5,556,042 | A * |  9/1996 | Roberg | A01D 41/1243 241/101.76 |
| 5,976,011 | A * | 11/1999 | Hartman | A01D 41/1243 460/111 |
| 6,070,816 | A * |  6/2000 | Hirsch | A01F 12/40 241/101.742 |

(Continued)

FOREIGN PATENT DOCUMENTS

| | | |
|---|---|---|
| AU | 3878101 A | 10/2001 |
| DE | 3540493 C1 |  4/1987 |

(Continued)

*Primary Examiner* — Robert E Pezzuto
*Assistant Examiner* — Adam J Behrens
(74) *Attorney, Agent, or Firm* — Peter K. Zacharias; Patrick M. Sheldrake

(57) ABSTRACT

An agricultural combine including a residue processing system including a straw spreader and at least one chaff spreader. The at least one chaff spreader includes a first chaff accelerator and a second chaff accelerator so that, in operation, chaff particles are accelerated by the first chaff accelerator to an intermediate energy level after which the chaff particles are further accelerated by the second chaff accelerator to an ejection energy level. The second chaff accelerator includes grinding elements for grinding the chaff particles while accelerating them to the ejection energy level.

14 Claims, 3 Drawing Sheets

(56) References Cited

U.S. PATENT DOCUMENTS

| | | | |
|---|---|---|---|
| 6,500,064 B1* | 12/2002 | Schrattenecker | A01D 41/1243 460/100 |
| 6,688,971 B2* | 2/2004 | Buermann | A01F 12/40 460/112 |
| 7,306,174 B2 | 12/2007 | Pearson et al. | |
| 8,105,140 B2* | 1/2012 | Teroerde | A01D 41/1243 460/112 |
| 8,152,610 B2 | 4/2012 | Harrington | |
| 9,730,390 B2* | 8/2017 | Maes | A01D 41/12 |
| 2002/0073675 A1* | 6/2002 | Buermann | A01F 12/40 56/255 |
| 2003/0109294 A1* | 6/2003 | Wolters | A01F 12/40 460/112 |
| 2005/0124399 A1* | 6/2005 | Holmen | A01D 41/1243 460/111 |
| 2011/0070934 A1 | 3/2011 | Teroerde et al. | |
| 2015/0373913 A1 | 12/2015 | Berry et al. | |
| 2016/0150728 A1 | 6/2016 | Duquesne et al. | |
| 2017/0034997 A1* | 2/2017 | Mayerle | A01F 12/40 |
| 2018/0070534 A1* | 3/2018 | Mayerle | A01F 12/40 |

FOREIGN PATENT DOCUMENTS

| | | | | |
|---|---|---|---|---|
| DE | 19750393 A1 | 4/1998 | | |
| DE | 102007005173 A1 | 8/2008 | | |
| EP | 1027820 A1 | 8/2000 | | |
| EP | 1897430 A1 | 3/2008 | | |
| FR | 1095015 A * | 5/1955 | | A01F 12/40 |
| FR | 2776468 A1 | 10/1999 | | |
| WO | WO-9710701 A1 * | 3/1997 | | A01D 41/1243 |
| WO | 2005041639 A1 | 5/2005 | | |
| WO | 2012022293 A1 | 2/2012 | | |
| WO | 2013087423 A1 | 6/2013 | | |

\* cited by examiner

CHAFF SPREADER WITH SEED BRUISING

CROSS REFERENCE TO RELATED APPLICATION

This application claims priority to Belgium Application No. 2016/5126 filed Feb. 23, 2016, the contents of which are incorporated herein by reference.

BACKGROUND OF THE INVENTION

The present invention relates to an agricultural combine comprising a residue processing system. The residue processing system comprising a straw spreader and at least one chaff spreader. Such agricultural combine is typically used to harvest a field by gathering the crop material and processing the crop material to separate residue from crop. This separation of residue and crop typically comprises two stages. A first stage wherein the large residue particles, mainly formed by straw, are separated, and a second stage wherein the small residue particles, also known as chaff particles, are separated from the crop. The nature of this dual stage processing system has as a result that many agricultural combines also comprise dual residue spreader systems. A first part of the residue spreading system spreads the straw onto the field, while the second part of the residue spreading system spreads the chaff onto the field.

A drawback of the known agricultural combines is that the chaff particles are not optimally spread onto the field. A further drawback of the known agricultural combines is that separating the chaff particles from the crop is never a hundred percent correct, such that remaining crop particles are present in the chaff, when the chaff is spread onto the field by the chaff spreader. When this chaff comprising the remaining crop elements is spread onto the field, the crop elements will tend to germinate and grow into a new plant on the field. For this reasons, in many countries, chaff is separately collected for avoiding this effect. However, separately collecting chaff is cumbersome and expensive.

In is an object of the present invention to provide a solution to at least one of the above mentioned problems which is effective and cost efficient.

SUMMARY OF THE INVENTION

The agricultural combine of the invention comprises a residue processing system, the residue processing system comprising a straw spreader and at least one chaff spreader, wherein each of the at least one chaff spreader subsequently comprises a first chaff accelerator and a second chaff accelerator, so that in operation, chaff particles are accelerated by the first chaff accelerator to an intermediate energy level after which the chaff particles are further accelerated by the second chaff accelerator to an ejection energy level. The first chaff accelerator and the second chaff accelerator are formed as disks comprising multiple rotor blades. A chaff transporting channel is provided to guide chaff particles from an output of the first chaff accelerator to an input of the second chaff accelerator. The rotor blades in the disks of the first chaff accelerator and the second chaff accelerator are mounted to rotate around a common axis.

Preferably the second chaff accelerator comprises grinding elements for grinding the chaff particles while accelerating them to the ejection energy level. Grinding of the chaff particles has as an effect that all crop elements that remain in the chaff are broken before ejection of the chaff. These broken crop elements loose the ability to germinate and grow into a new plant. Furthermore, grinding has as a result that any seed element from weeds or unwanted plants is destroyed in the grinder. Providing the chaff spreader into parts, allows to implement the grinder in an easy manner in an existing situation or without significant deviation from existing situations. This allows a cost effective and reliable solution. Even without the grinding elements, the chaff spreader with the two-stage design proves to be more effective and provide a better spreading of chaff over the field.

Preferably the grinding elements comprise multiple hammers and at least one shred bar mounted in cooperation with the multiple hammers. A shred bar and multiple hammers form a cost effective and reliable way to grind the chaff and the ensure that any seeds or crop elements present in the chaff is sufficiently broken and damaged. Thereby it will be clear that a seed or crop element is considered sufficiently broken or damaged when the seed or crop element loses the ability to germinate and grow into a new plant.

Preferably, a chaff transporting channel is provided to guide chaff particles from an output of the first chaff accelerator to an input of the second chaff accelerator. By providing a chaff transporting channel, the chaff flow can be easily managed in a reliable manner.

Preferably, the first chaff accelerator and the second chaff accelerator are formed as rotatable discs comprising multiple rotor blades. Further preferably, the rotatable discs of the chaff accelerators are mounted to rotate around a common axis. Thereby, the first chaff accelerator is typically located on top of the second chaff accelerator. Thereby, the chaff spreader can be designed and manufactured in a compact manner, which highly corresponds to the current chaff spreading systems.

Preferably, the chaff transporting channel is arranged outside of the periphery of the first and second chaff accelerators. Alternatively, the chaff transporting channel is arranged inside of the periphery of the first and second chaff accelerators between the first and second chaff accelerators. When the transporting channel is arranged outside of the periphery of the first and second chaff accelerator, an opening at an outer edge or at the periphery of the first accelerator is connected via the transporting channel with an opening at an edge or at the periphery of the second chaff accelerator. This allows the first and second chaff accelerator to be mounted directly on top of each other while the transporting channel is located at a side of the two chaff accelerators. In the alternative configuration, the transporting channel is formed between the rotatable discs, so that no further space is required outside of the periphery of the discs to ensure correct operation. Thereby, both alternatives are applicable and both alternatives have advantages, depending on the specific situation.

Preferably, the first and second chaff accelerator are connected to a single motor via a gear box, so that the single motor is adapted to drive the first chaff accelerator at a first rotating speed, while driving the second chaff accelerator at a second rotating speed, which is higher than the first rotating speed. Such configuration is easy to realize and provides a reliable driving mechanism for driving the two chaff accelerators. By driving the second chaff accelerator at a higher rotational speed than the first chaff accelerator further improves the operational properties of the chaff spreader.

Preferably, a bypass element is provided to bypass the second chaff accelerator in a predetermined position of the bypass element. Further, preferably, the chaff transporting channel and the bypass element are formed as a single displaceable element that is arranged in a displaceable manner to embody the chaff transporting channel in a first position thereof, and to embody the bypass element in a predetermined second position, different from the first position. The bypass element allows in predetermined circumstances, to bypass the second chaff accelerator. This improves the operational possibilities offered by the chaff spreader.

Preferably, a decoupling element is provided to decouple the second chaff accelerator from the first chaff accelerator when the bypass element is in the predetermined position. By decoupling the second chaff accelerator from the first chaff accelerator, the second chaff accelerator is not driven and consequently does not consume energy.

BRIEF DESCRIPTION OF THE DRAWINGS

Some embodiments of apparatus and/or methods in accordance with embodiments of the present invention are now described, by way of example only, and with reference to the accompanying drawings, in which.

DETAILED DESCRIPTION OF THE DRAWINGS

Figure 1:
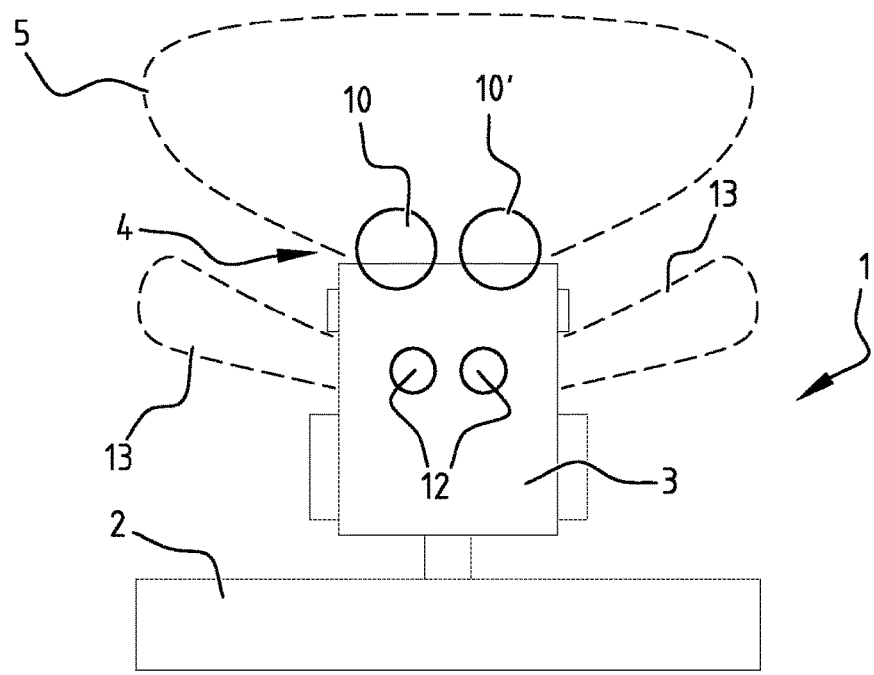
FIG. 1 shows a top view of an agricultural vehicle with a residue spreading system.

FIG. 1 shows a schematic top view of an agricultural combine 1. The combine 1 comprises a header 2, which is connected to the front end of a combine body 3. The back end of the combine body 3 comprises a residue spreading system 4. Thereby, when the combine 1 is harvesting a field, the header 2 cuts the crop material from the field, and draws the crop material into the body 3 of the combine 1. In the body 3, the crop material is processed to separate the harvest from the residue. The residue is then transported, inside the body 3 of the combine 1, to the residue spreading system 4, which throws the residue onto the field. Thereby, the residue spreading system 4 is conventionally configured to approach a situation wherein the residue is evenly distributed on the field over a width that is equal to the width of the header 2.

The distribution of the residue on the field is adaptable by steering the residue spreading system 4. Indeed, residue spreading systems 4 according to the prior art can be steered to influence the residue distribution, for example to compensate for external influences such as wind so that an even distribution can be obtained in multiple circumstances. Particularly, the force/speed with which the residue spreading system 4 throws the residue out of the back end of the agricultural combine 1 can be adjusted. Furthermore, the angular range over which the residue spreading system 4 spreads the residue can also be adjusted. Thereby, the residue spreading system 4 typically comprises multiple (at least a left and a right) of such adjustable mechanisms 10, 10' for throwing the residue out of the back end of the combine 1. This allows to change the distribution of residue over the field by adapting the residue spreading system 4. Since such mechanisms 10, 10' are known in the prior art, no further specifications are given regarding such residue spreading system since the skilled person knows these systems and will know how such systems can be steered to adapt the residue distribution.

In FIG. 1 the agricultural combine is illustrated in operation, wherein residue is expelled from the combine. The expelled residue has two parts, referred to with reference numbers 5 and 13 respectively. The cloud 5 illustrates the straw that is expelled by the residue spreading system and the cloud 13 illustrates the chaff that is expelled by the residue spreading system. Chaff and straw are separated from the harvest in the body 3 of the agricultural combine 1 using different techniques. As a consequence, many residue spreading systems comprise separate spreaders for chaff and straw, explaining the chaff cloud 13 located at a distance from the straw cloud 5.

Figure 2:
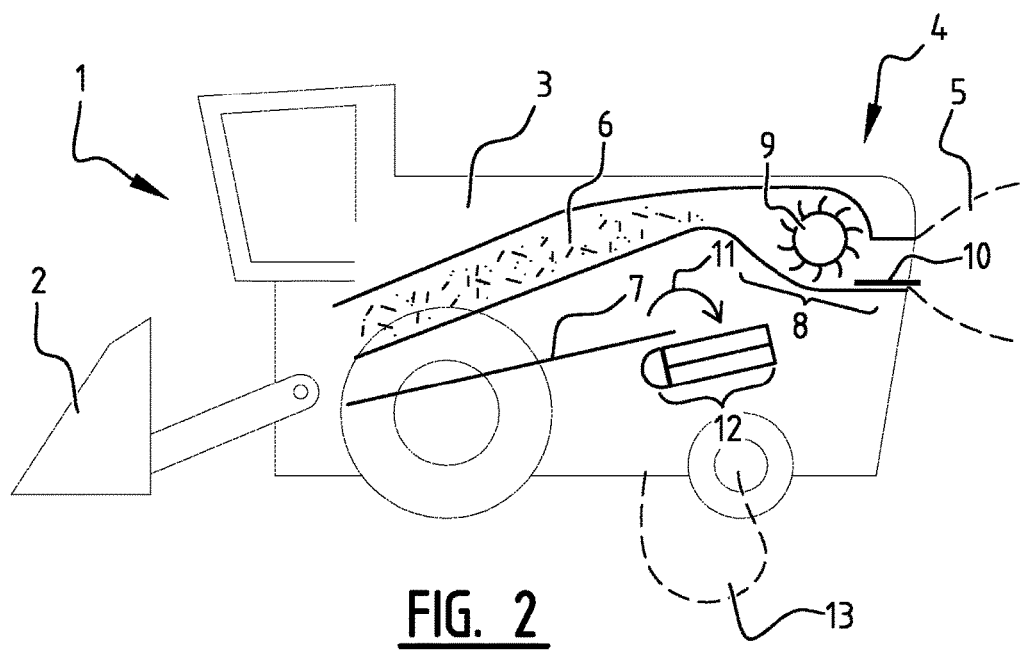
FIG. 2 illustrates the crop processing system in the body of the agricultural vehicle.

FIG. 2 illustrates the principles of processing crop material inside a body 3 of an agricultural combine 1. Reference number 6 illustrates the threshing process of the crop material that is cut from the field via the header 2. During threshing 6, the smaller parts such as the harvest particles and the chaff particles are separated from larger crop material elements such as straw. These larger elements are chopped by a chopper 9 and subsequently expelled at the back end of the agricultural combine 1. As described above, the straw can be expelled via residue spreading discs 10 or via fins.

In the body 3 of the agricultural combine 1, the smaller particles are further processed, as is illustrated with reference number 7, to separate the harvest particles from the chaff particles. These chaff particles are collected as is illustrated with arrow 11, in a chaff spreader 12. The chaff spreader 12 distributes the chaff onto the field separately from the straw spreader 8.

Figure 3:
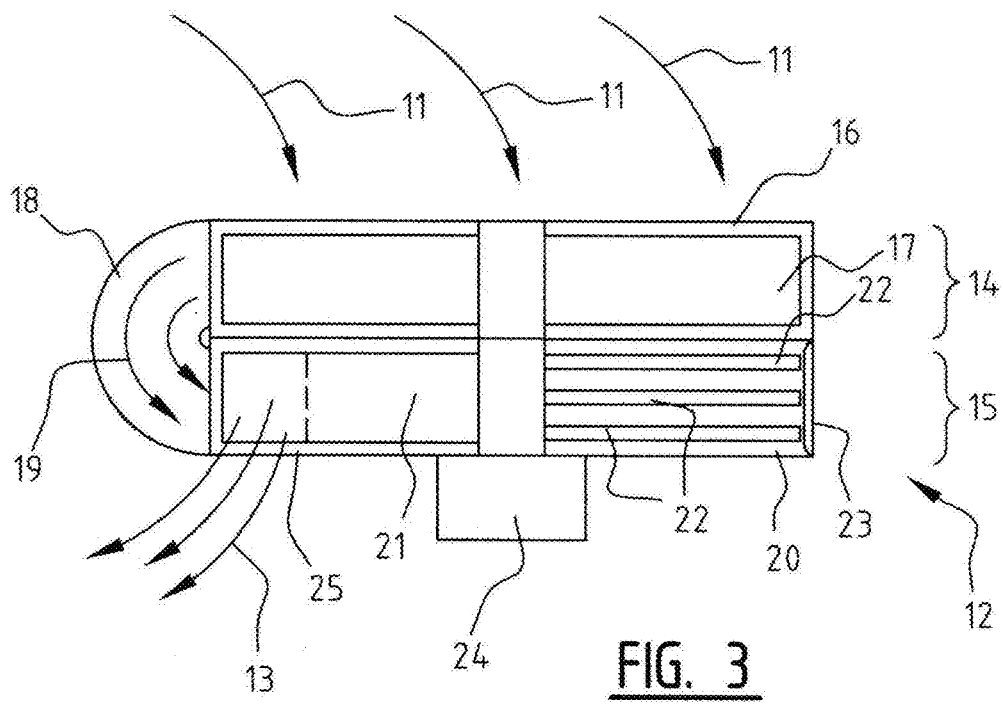
FIG. 3 shows a cross-section of a chaff spreader according to an embodiment of the invention.

FIG. 3 shows a first embodiment of the chaff spreader 12 of the invention. The chaff spreader 12 comprises an upper segment 14 and a lower segment 15. In the embodiment of FIG. 3, the upper segment 14 is located directly adjacent the lower segment 15. The upper segment 14 embodies a first chaff accelerator while the lower segment 15 embodies a second chaff accelerator.

The upper segment 14 of the chaff spreader 12 comprises a cylindrically shaped housing 16 which is open at the top so that chaff can fall into the housing 16, which is illustrated in FIG. 3 with arrows 11. The upper segment 14 further comprises a rotor with multiple rotor blades 17, driven by a motor 24 so that the chaff that falls into the housing is accelerated by the rotor and rotor blades.

The upper segment 14 of the chaff spreader 12 is connected to the lower segment 15 of the spreader 12 via a chaff transporting channel 18. The chaff transporting channel 18 connects an opening at a side of the upper segment housing 16 with a further opening at a side of the lower section 15. The opening at the upper section 14 is considered an upper outlet opening since chaff particles are removed from the housing 16 via that opening, as is illustrated with arrow 19. The further opening at the lower section 15 is considered a lower inlet opening of the lower section 15 since chaff particles are introduced in this lower section 15 via this further opening.

The lower section 15 also comprises a cylindrical housing 20, with a diameter that is preferably substantially the same as the diameter of the cylindrical upper housing 16. The lower segment 15 further comprises a rotor having multiple rotor blades 21, analogue to the rotor with rotor blades at the upper segment 14. The lower segment 15 further comprises grinding elements 22, 23, in FIG. 3 showed as hammers 22 and a shred bar 23. The rotor with the rotor blades and the grinding elements 22 at the lower segment 15 are also driven by a motor 24. The lower segment 15 further comprises a lower outlet opening 25 into the housing 20, which lower outlet opening is formed at a side of the housing 20 so that the chaff can be ejected from the spreader 12 via the outlet opening 25. This is illustrated with arrows 13.

Figure 5:
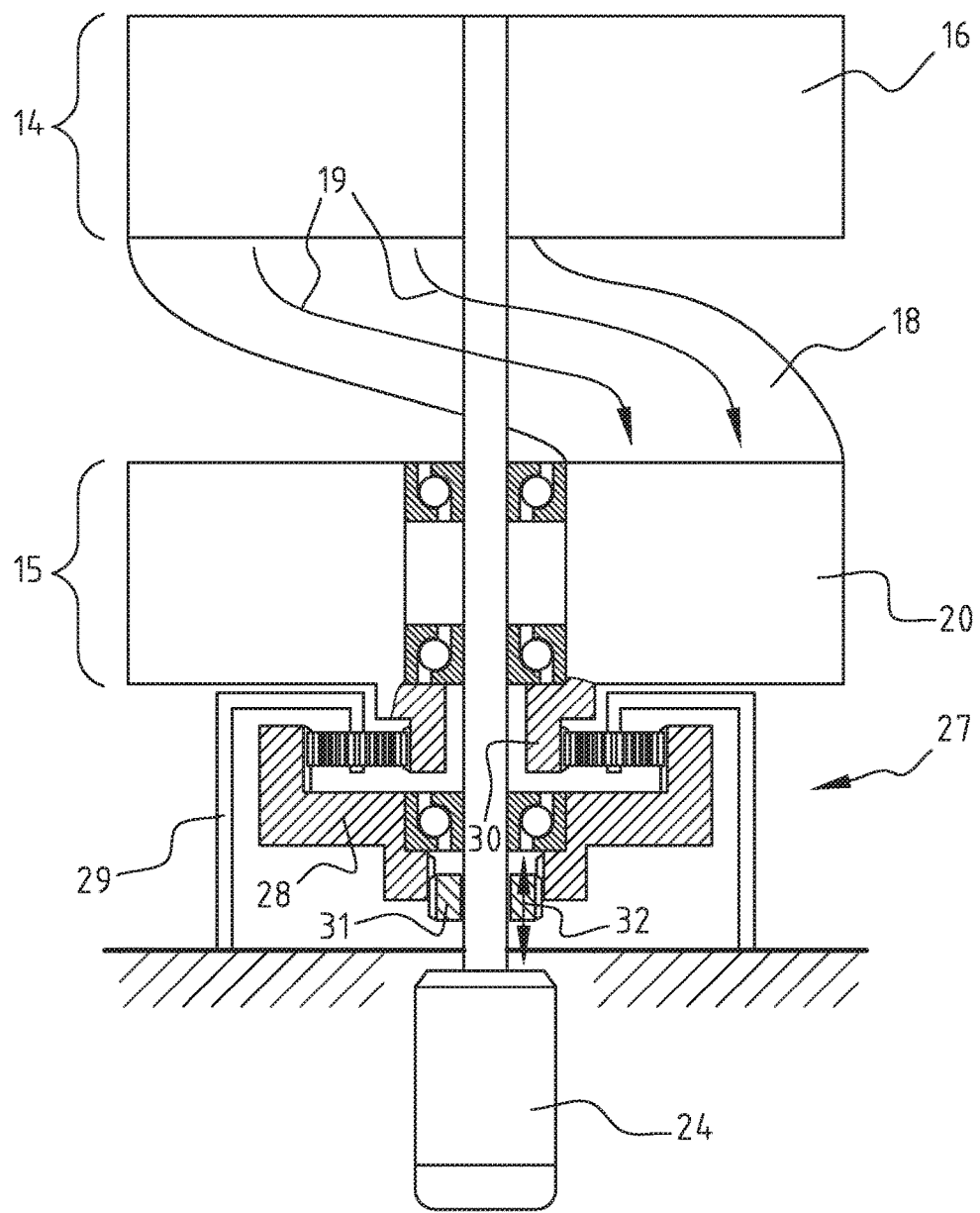
FIG. 5 shows a cross-section of a chaff spreader according to a further embodiment of the invention.

Preferably, the motor 24 is configured to drive the upper rotor at a first speed and the lower rotor at a second speed that is higher than the first speed. This is preferably realized via a single motor and a gear box, for example a planetary gear box as is shown in FIG. 5. The skilled person will understand how two rotors can be driven at different speeds at a single motor and a gear box, and therefore this aspect is not described in more detail.

Figure 4:
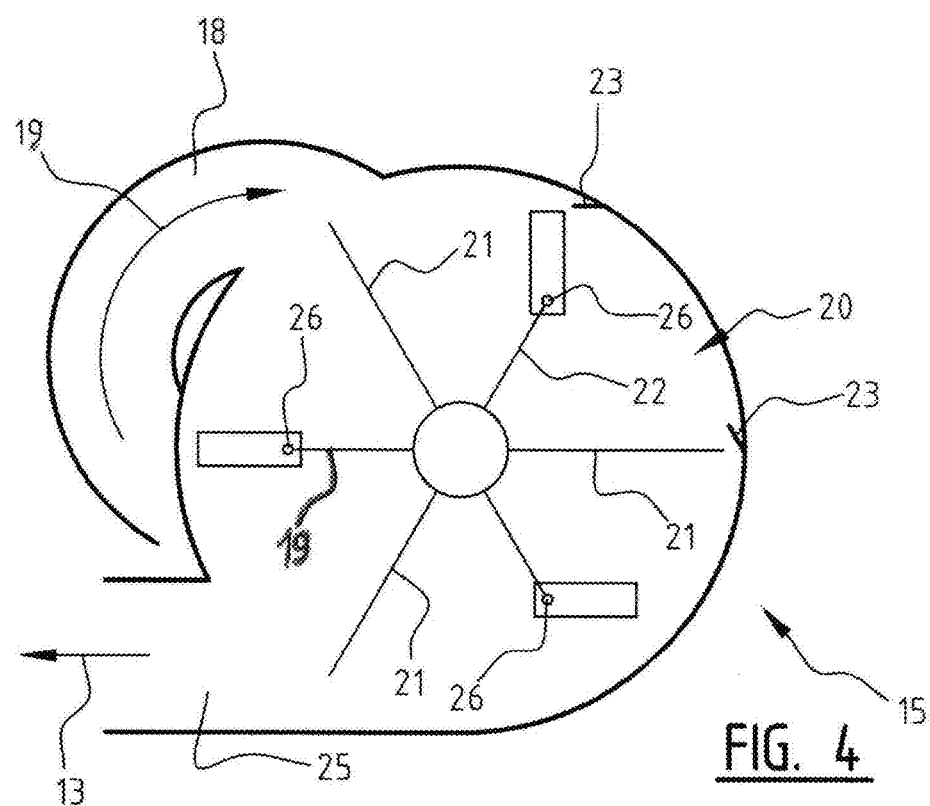
FIG. 4 shows a top view of the lower disk of the chaff spreader of FIG. 3.

FIG. 4 shows a top view of the lower chamber 20 of the chaff spreader. This top view illustrates how the chaff transporting channel 18 can be formed outside of the periphery of the rotors and in such a manner that the chaff can be optimally guided from an upper outlet at the upper segment to a lower inlet at the lower segment. This is realized in the embodiment of FIG. 4 by shaping the chaff transporting channel with a curvature that is chosen to bend the outgoing flow of chaff particles of the upper segment to an ingoing flow at the lower segment. Such flow is illustrated in FIG. 4 with arrow 19. FIG. 4 furthermore shows the rotor with the multiple rotor blades 21, which ensure that the chaff particles are forced to follow the rotor speed, and comprising multiple hammers 22, preferably comprising a hinge 26 so that the outer ends of the hammers 22 can pivot with respect to the hinge 26. Due to the rotation of the rotor, the hammers will be forced to the periphery of the chamber 20, thereby hitting against or moving at least close to shred bars 23. As a result, the chaff particles are ground between the hammers and the shred bars. Any seed element or crop element is crushed. The lower segment 20 further comprises a lower opening 25 so that the chaff can be expelled 13. The skilled person will realize that multiple hammer set-ups can be designed and that one or more shred bars 23 can be provided, that the number of hammers 22 and/or rotor blades 21 can be chosen depending on multiple factors.

In FIG. 4, the chaff transporting channel 18 is shown in a position where it covers the upper outlet of the upper segment 14 as well as the lower inlet of the lower segment 15. This chaff transporting channel 18 can be mounted in a displaceable manner, so that when the chaff transporting channel is displaced, the chaff transporting channel 18 does not cover the upper outlet of the upper segment 14. As a consequence, chaff will be expelled directly by the upper segment, the lower segment is bypassed, and no grinding by the lower segment occurs. Such chaff transporting channel 18 could allow the farmer or operator of the agricultural vehicle to choose the processing settings, particularly whether grinding is preferred or not.

FIG. 5 shows an alternative embodiment of the invention wherein the lower segment 15 and the upper segment 14 are not positioned directly adjacent to each other, and wherein the chaff transporting channel 18 bridges the gap between the upper segment 14 and the lower segment 15. The advantage of such set-up is that the chaff transporting channel 18 can be completely formed within the periphery of the upper and lower cylindrical bodies 16, 20. In such setup, the upper outlet opening is formed at a bottom of the upper chamber, and the lower inlet opening is formed at a top of the lower chamber. The further operational characteristics of the embodiment of FIG. 5 are substantially the same or at least analogue as described above in relation to FIGS. 3 and 4.

FIG. 5 shows the motor 24 and the gear box 27 in more detail. Thereby, the figure shows how the shaft of the motor is directly connected to the upper rotor of the upper segment 14. Furthermore, planetary gears are connected to the frame and a sun gear 30 is connected to the lower rotor of the lower segment 15. The ring gear 28 can be coupled to the motor shaft via a coupling element 31. This is illustrated by arrow 32, wherein the upper position of the coupling element 31 interconnects the ring gear with the central shaft and a lower position disconnects the ring gear 28 from the central shaft of the motor. By connecting the ring gear 28 to central shaft of the motor 24, the lower rotor of the lower segment 20 is driven, depending on the ratios of the gears in the planetary gear box, at a speed different from the rotational speed of the motor shaft. Thereby, a compact and reliable mechanism is provided to drive the upper rotor and lower rotor at different rotating speeds.

The above description describes the housing 16, 20 as cylindrical. It is noted that the term cylindrical points to the visual impression that this housings generates, and not to the mathematical shape thereof. In practice, the housing is a bit eccentric so that near the outlet, the distance of the rotor to the housing is a bit bigger to prevent blockage by pinching of the chaff between the rotor and the housing. Therefore the term cylindrical is not intended to limit the scope of protection, but rather to give a more general impression of the principles of the invention.

Based on the figures and the description, the skilled person will be able to understand the operation and advantages of the invention as well as different embodiments thereof. It is however noted that the description and figures are merely intended for understanding the invention, and not for limiting the invention to certain embodiments or examples used therein. Therefore it is emphasized that the scope of the invention will only be defined in the claims.

The invention claimed is:

1. A chaff spreader for an agricultural combine, the chaff spreader comprising:
    a first chaff accelerator and a second chaff accelerator subsequently positioned so that, in operation, chaff particles are accelerated by the first chaff accelerator to an intermediate energy level after which the chaff particles are further accelerated by the second chaff accelerator to an ejection energy level, each of the first chaff accelerator and the second chaff accelerator being formed as a disk comprising a plurality of rotor blades, each of the first and second chaff accelerators having a periphery; and
    a chaff transporting channel for guiding the chaff particles from an output of the first chaff accelerator to an input of the second chaff accelerator, the chaff transporting channel arranged outside of the peripheries of the first and second chaff accelerators,
    wherein the plurality of rotor blades of the disk of the first chaff accelerator and the plurality of rotor blades of the disk of the second chaff accelerator are equivalent to each other and mounted to rotate around a common axis.

2. The chaff spreader according to claim 1, wherein the second chaff accelerator comprises grinding elements for grinding the chaff particles while accelerating them to the ejection energy level.

3. The chaff spreader according to claim 2, wherein the grinding elements comprise multiple hammers and at least one shred bar mounted in cooperation with the multiple hammers.

4. The chaff spreader according to claim 1, wherein the disk of the first chaff accelerator is rotatable to rotate along with the plurality of rotor blades of the disk of the first chaff accelerator, and wherein the disk of the second chaff accelerator is rotatable to rotate along with the plurality of rotor blades of the disk of the second chaff accelerator.

5. The chaff spreader according to claim 1, further comprising a single motor and a gearbox, wherein the first and second chaff accelerators are connected to the single motor via the gearbox so that the single motor is adapted to drive the first chaff accelerator at a first rotating speed while driving the second chaff accelerator at a second rotating speed which is higher than the first rotating speed.

6. The chaff spreader according to claim 1, wherein the chaff transporting channel is mounted in a displaceable manner so that the second chaff accelerator is bypassed in a predetermined position.

7. The chaff spreader according to claim 2, wherein the second chaff accelerator is disposed underneath the first chaff accelerator for grinding the chaff particles after the chaff particles have exited the first chaff accelerator.

8. A chaff spreader for an agricultural combine, the chaff spreader comprising:
   a first chaff accelerator and a second chaff accelerator subsequently positioned so that, in operation, chaff particles are accelerated by the first chaff accelerator to an intermediate energy level after which the chaff particles are further accelerated by the second chaff accelerator to an ejection energy level, each of the first chaff accelerator and the second chaff accelerator being formed as a disk comprising a plurality of rotor blades; and
   a chaff transporting channel for guiding the chaff particles from an output of the first chaff accelerator to an input of the second chaff accelerator, wherein the chaff transporting channel is mounted in a displaceable manner so that the second chaff accelerator is bypassed in a predetermined position,
   wherein the plurality of rotor blades of the disk of the first chaff accelerator and the plurality of rotor blades of the disk of the second chaff accelerator are equivalent to each other and mounted to rotate around a common axis.

9. The chaff spreader according to claim 8, wherein the second chaff accelerator comprises grinding elements for grinding the chaff particles while accelerating them to the ejection energy level.

10. The chaff spreader according to claim 9, wherein the grinding elements comprise multiple hammers and at least one shred bar mounted in cooperation with the multiple hammers.

11. The chaff spreader according to claim 8, wherein the disk of the first chaff accelerator is rotatable to rotate along with the plurality of rotor blades of the disk of the first chaff accelerator, and wherein the disk of the second chaff accelerator is rotatable to rotate along with the plurality of rotor blades of the disk of the second chaff accelerator.

12. The chaff spreader according to claim 8, wherein the chaff transporting channel is arranged outside of the peripheries of the first and second chaff accelerators.

13. The chaff spreader according to claim 8, further comprising a single motor and a gearbox, wherein the first and second chaff accelerators are connected to the single motor via the gearbox so that the single motor is adapted to drive the first chaff accelerator at a first rotating speed while driving the second chaff accelerator at a second rotating speed which is higher than the first rotating speed.

14. The chaff spreader according to claim 9, wherein the second chaff accelerator is disposed underneath the first chaff accelerator for grinding the chaff particles after the chaff particles have exited the first chaff accelerator.

* * * * *